United States Patent [19]

Seiling

[11] 4,107,341

[45] Aug. 15, 1978

[54] METHOD WITH AN IMPROVED MIXING CYCLE FOR PREPARING DOUGH

[75] Inventor: Samuel O. Seiling, Richmond, Va.

[73] Assignee: AMF Incorporated, White Plains, N.Y.

[21] Appl. No.: 743,450

[22] Filed: Nov. 22, 1976

Related U.S. Application Data

[63] Continuation-in-part of Ser. No. 595,469, Jul. 14, 1975, abandoned.

[51] Int. Cl.² .............................................. A21D 8/02
[52] U.S. Cl. ..................................... 426/504; 426/19; 426/549
[58] Field of Search .................... 426/19, 20, 60, 231, 426/549, 498, 504, 21

[56] References Cited

U.S. PATENT DOCUMENTS

| | | | |
|---|---|---|---|
| 2,869,484 | 1/1959 | Patterson | 426/19 |
| 3,053,666 | 9/1962 | Henika et al. | 426/19 X |
| 3,219,455 | 11/1965 | Dubois | 426/19 X |
| 3,228,772 | 1/1966 | Buddemeyer et al. | 426/19 X |
| 3,429,712 | 2/1969 | Turner | 426/19 |

*Primary Examiner*—Robert A. Yoncoskie
*Attorney, Agent, or Firm*—George W. Price; Charles J. Worth

[57] ABSTRACT

A method of preparing dough having an improved mixing cycle after the introduction of dough ingredients into a mechanical mixer where the mixing function takes place in a three sequential step operation, with the objective of improving heat removal and/or shortening mix time. A first predefined time interval is employed at a first select speed then a second mixing speed is employed in excess of the first speed for an interval of time in excess of the first interval and finally, the mixer operates at a speed less than the second speed, but not less than the first speed. The speed of rotation for the second time interval is always the greatest of the three speeds employed.

5 Claims, 4 Drawing Figures

INVENTIVE METHOD

METHOD WITH AN IMPROVED MIXING CYCLE FOR PREPARING DOUGH

The present invention is a continuation-in-part of my previously filed patent application entitled Method of Programming A Dough Mixing Cycle, U.S. Ser. No. 595,469 filed July 14, 1975, now abandoned.

When preparing a dough batch various ingredients are introduced into a mixing apparatus for blending and mixing. During this procedure, there are four steps which conventionally define the entire dough preparation operation. They respectively are: loading, preliminary blending, developing, and unloading.

In accordance with accepted practice, the overall mixing cycle time includes: the time required to load the mixer, the time for running the mixer to fully develop the dough, and lastly, that time required to discharge the mixer so that it is ready to repeat the overall cycle.

The present invention is particularly concerned with a method of defining the operating characteristics of the preliminary blending and the developing phases of the dough mixing cycle. For purposes of the present invention, it has been decided to assume that the loading and discharge time, respectfully, are constant and, therefore, the method of the present invention does not focus on such times.

By way of background, most large commercial high speed dough mixers operate at two speeds during the mixing operation. A low speed, which is nominally one-half of the high speed, is used initially to blend the ingredients after they have been loaded into the mixer. Prior art holds that it is desirable to utilize a low mixer speed for the preliminary blending of ingredients so that they may be brought to a condition favorable for subsequent mixing and development.

A high speed is then utilized during the balance of the mixing time in order to obtain final development of the dough. In actual operation, the machine starts at a low speed for a short period of time and is caused to automatically shift into high speed for the duration of the mixing operation. Depending upon the particular combination of ingredients of which the batch is composed, the time for the aforementioned program is usually controlled by a suitable automatic timer.

After such ingredients have been developed into dough, and discharged from the mixer, it must then be further handled before a finished product is at hand. For an example, such handling can consist of dividing, rounding, intermediate proofing, molding, and panning. However, in order to properly carry out each of these respective operations, it is necessary that the dough as it leaves the mixer be developed to a sufficient consistency so as not to inhibit these operations. Furthermore, it is essential that the temperature of the mixed mass be maintained at a certain desired level to obtain the best final product and so that subsequent manipulation and handling can be satisfactorily carried out prior to the final bake.

It is commonly recognized that the time required to develop dough can be reduced by mixing at a higher speed. This, however, requires a higher rate of energy input which in turn causes the temperature of the dough to increase more rapidly. Considerable heat is generated within the dough during the mixing cycle, and the prior art is replete with different tacts employed to overcome the heat removal problems normally associated with high speed dough mixers. For an example, attempts have been made to introduce cool air streams and/or water streams into the mixer, and/or water streams to the exterior of the mixer, as well as to employ thermostatic refrigeration controls. However, such approaches have been found to be cumbersome, expensive, difficult to maintain, and sometimes inefficient and inadequate.

In U.S. Pat. No. 1,535,204 cold air and water are supplied to a mixer where the temperature of the dough is automatically controlled in order to overcome heating problems within the dough mass so as not to detract from the quality of the finished product. U.S. Pat. No. 1,686,967 discloses a device for delivering cool air into the mixing receptacle where warm air is withdrawn therefrom to insure a reduced temperature within the dough mass. U.S. Pat. No. 3,237,241 discloses four operational variables that can influence the quality of the product being mixed within a continuous internal mixer. The parameters, however, do not relate specifically to dough handling mixers. Such prior art patents as 3,332,668 and 3,332,669 are directed to thermostic controls which serve to maintain the temperature of the dough at a desired level; but they do not relate to the dough mixing program. In all cases, such prior art patents fail to identify and relate the heat transfer characteristics to the overall mixing cycle or to mixing speed.

The conventionally recognized developing phase of the total mixing cycle in reality consists of two distinct sub-phases. The first of these sub-phases is the development of the ingredients from a wet paste into a cohesive mass. The second is the final development into dough of the required consistency for subsequent processing.

In the sub-phase of developing to a cohesive mass the dough exhibits relatively low viscosity and poor heat removal properties, mostly due to the adhesion of dough paste to the walls of the mixer, then insulating them from attaining heat removal. In the second subphase of final development the dough is characterized by a high viscosity and much higher heat removal properties.

The principle features of the present invention are directed to a method of programming a dough mixing cycle after the introduction of raw ingredients into a mechanical mixer, or the like, to improve heat transfer, including the steps of: initiating the mixing operation of said ingredients for a first predefined time interval during a first select speed; transferring the mixing operation to a second predefined time interval in excess of said first time period, whereby said mixer is urged to rotate at a speed in excess of said first select speed; and causing said mixing to operate for a third time interval also being greater than said first time interval whereby mixer is urged to rotate at a speed less than said second select speed, but not less than said first select speed, thus enabling the mixing cycle time to vary as a function of said first, second, and third time periods respectively, while said speed of rotation for said second time period is the greatest of the three speeds.

Also within the scope of the present invention are the steps which include energizing said mixer for rotation at a first speed for a relatively short period of time for preliminary blending; transferring the rotation of said mixer to a second substantially higher speed of rotation for a period of time causing said ingredients to form a cohesive mass during which time the heat transfer is poor; and by transferring the speed of rotation to a level less than said second speed but not less than the initial speed for maximum heat transfer out of the dough being developed, causing final development of said dough within said mixer at desired temperature.

Up until the present invention, in order to obtain a batch having a final temperature of, for instance, 80° out of the mixer, a form of cooling is applied to the exterior of the mixing bowl. This serves to remove the heat which results from the initial heat of the ingredients being placed in the mixer, and that added amount of energy required to develop the dough. Present day practice dictates that the raw dough ingredients, when placed into the mixer be as cold as it is practical so that the heat being removed is mostly that resulting from dough development.

Accordingly, it is the main object of the present invention to provide a method for overcoming the defects of the prior art.

Still another object of the present invention is to provide a programmed method for batch mixing of ingredients under controlled conditions to minimize the overall time in the operation cycle.

Still another object of the present invention is to provide a method by which the running phase of the mixing cycle is controlled in order to maximize the heat removal.

This and other objects of the present invention will be more readily understood with respect to the accompanying specification, claims and drawing.

IN THE DRAWINGS

According to the invention, it has been found that during the first part of the conventional development phase of the mixing cycle, after preliminary blending of the raw ingredients, the heat transfer out of the mixer is very poor regardless of the amount of energy imparted to the dough. Obviously, since the ingredients are in a non-cohesive and less viscous state, the amount of energy imparted to the mass in the mixer and the ensuing increase in temperature, is not of a high magnitude. This assumes that the basic constituents include flour and water among others. However, as mixing continues and the total energy imparted to the ingredients becomes sufficiently high, the flour starts to form gluten and the nature and character of the ingredients mixture begins to change and starts to form a cohesive uniform mass of high viscosity which clings together without coating the surface of the mixer. In turn, there is a pronounced tendency on the part of this mass to absorb a higher rate of energy creating a more rapid temperature rise. But at the same time, the heat removal characteristics of the mass becomes greatly improved.

The problem of not being able to remove much heat during the early phase of the mixing operation, is in part due to the fact that the ingredients are blended and there is a tendency on the part of some to adhere to the mixer jacket walls, which, in effect, acts as an insulator. This, of course, inhibits the transfer of heat out of the mass being worked upon. On the other hand, once the dough has started to develop and is in a cohesive state, heat transfer out of the mixer becomes considerably better.

Figure 1:
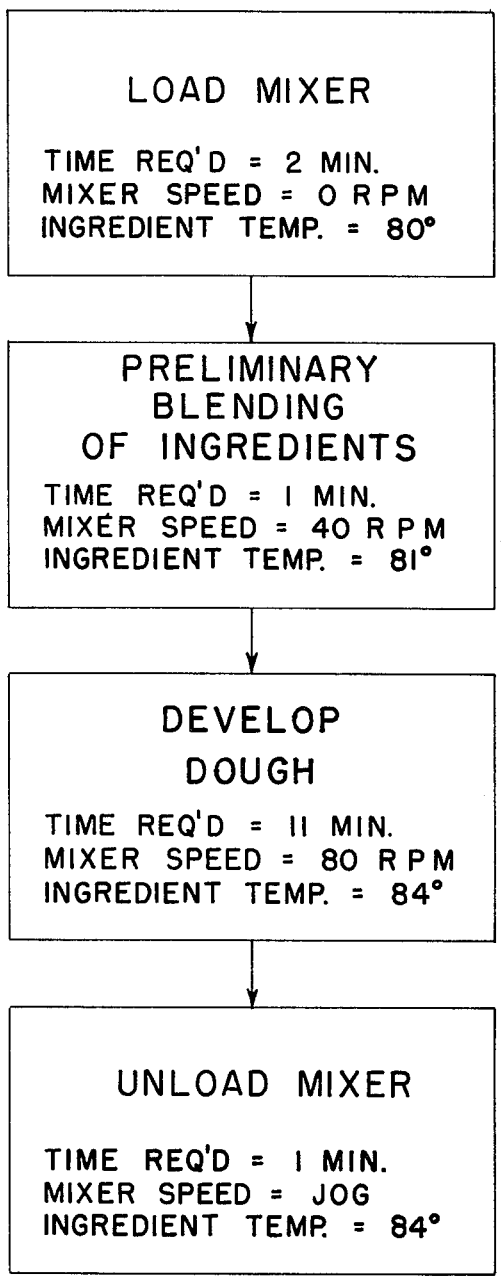
FIG. 1 is a flow diagram of the steps employed in the prior art.
Figure 2:
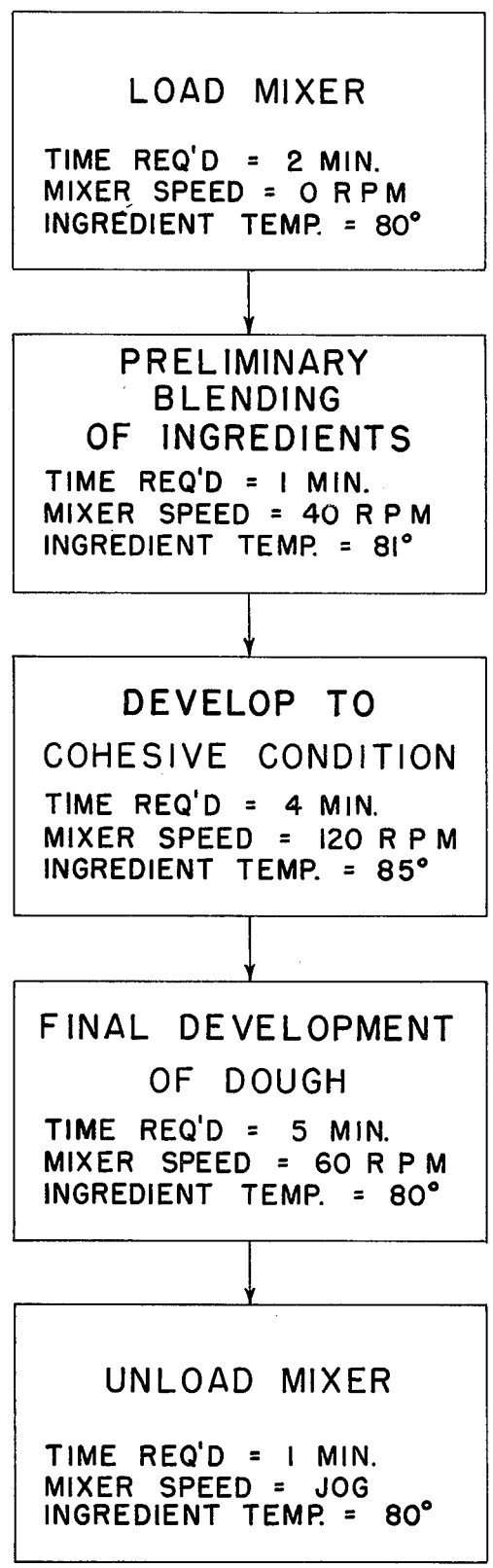
FIG. 2 is a flow diagram of the steps employed in the present invention.
Figure 3A:
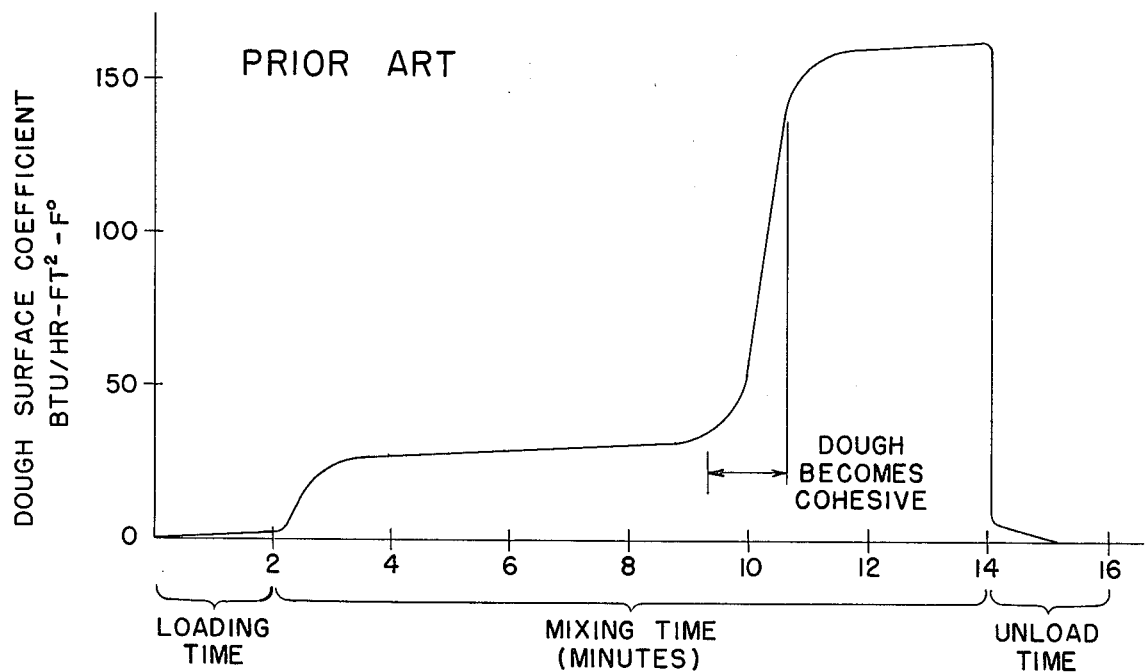
FIGS. 3 and 3b illustrates a graphic representation of dough surface coefficient vs. time (during mixing cycle) for the prior art and with the invention respectively.

As can be seen from FIG. 3a, the curve for conventional mixers, the coefficient is low throughout the first part of mixing and increases significantly at the later part of mixing after the dough becomes cohesive. With currently available commercial mixers, it has been found that the longest stage of mixing is that found in the early part of the operation prior to attaining a cohesive state. The shortest part of the cycle occurs after the mix has become fully cohesive until it is finally developed. It is at this last sub-phase that considerable more heat is imparted and less time exists to remove this heat; what follows from this, is the fact that attempts have been made to decrease the total mixing cycle time by correspondingly increasing the mixer speed in general. However, in the last analysis, the most important aspect of this attempt to reduce the time duration resides in the successful ability to remove heat, since the heat input rate increases with mixer speed.

In accordance with the present invention, what is contemplated is a series of discrete steps enabling a time allocation in accordance with the heat input and heat removal properties of the batch as it is being mixed from one stage into the next. Accordingly, the mixer performing the work would initially start at a low speed for a very short period of time duration for example ½ minute, in order to provide a preliminary blending of the ingredients. Thereafter, by suitable control means, i.e. automatic timer, the apparatus would automatically shift to a pre-programmed, maximum speed for a period of time sufficient to enable the ingredients to have sufficient energy imparted thereto and forming a cohesive mass. By virtue of operating the mixer at maximum speed during the sub-phase, just prior to forming the cohesive mass, the time period required to reach this point has been reduced. At this designated point in time, the apparatus, i.e., the mixer, is caused to shift to a lower speed, that is — a speed no less than the initial speed, but less than the high speed, to enable the final development sub-phase of the dough within the mixer to be accomplished in a longer time period, when heat removal is maximum, thereby reducing the final temperature.

Figure 3B:
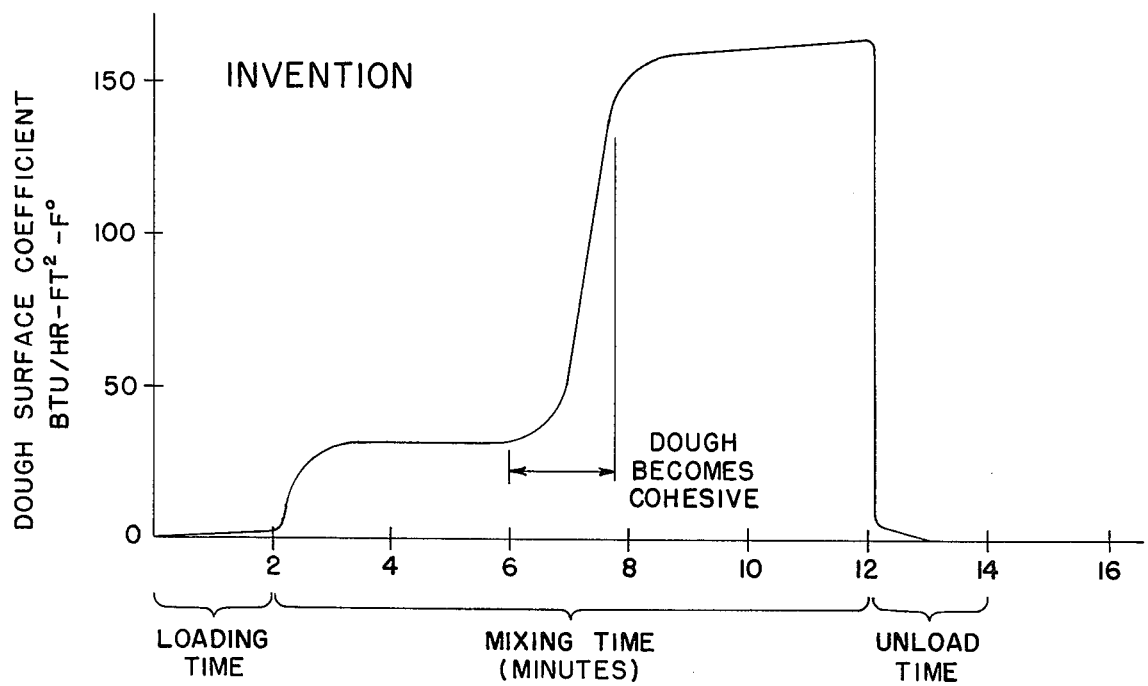

The final result of this programmed mixing cycle is that the final temperature of the dough will be significantly lower than would be the case in the prior art application, and the total time to complete the mixing operation would also be less, as illustrated in FIG. 3b.

It is obvious from the foregoing disclosure of invention that the mixer speed during the final development sub-phase (3rd speed) can be adjusted upward or downward with the effect of decreasing or increasing total mixing time, with the accompanying effect of increasing or decreasing, respectively, the final dough temperature.

In evaluating and identifying the character and nature of the various steps in the cycle, the time required for dough to be manipulated from the cohesive state to that of maximum development of the gluten, would increase. However, the time required to enable the ingredients to be handled to the cohesive state would decrease time by a magnitude in excess of the added time called for in the development of the gluten. During this latter stage, maximum heat transfer takes place and the final product is colder, with the additional result that the overall total mixer time cycle is reduced.

For purposes of better explaining the invention, an example is set forth and shown in the block diagram covering the prior art and the present invention. The time required, mixer speed and ingredient temperature for each operation of the entire cycle are also identified. In both cases, a horizontal dough mixer is employed. The ingredient temperature is the temperature of all ingredients inside the mixer at the end of a function. When comparing the prior art to that of the present invention, it is evident that in accordance with the invention, the mixer is programmed to include an additional block or step. The final dough temperature is 4° cooler in the application of the present invention. The total mixing time, as compared to the prior art, indicates a two minute decrease in the time for the present invention. This represents a 13% decrease in mixing cycle time or, in fact, 13% additional production capacity for the mixer.

Table A (hereinafter) illustrates typical dough formula of ingredients for bread doughs, bun doughs, and sweet doughs. These ingredients and the percentage in each of the type of doughs are indicated for illustrative purposes, and are assumed to be typical but not restrictive. A typical program, table B (hereinafter) has been illustrated for a straight dough process for producing bread or rolls. By utilizing this invention, mixing programs for sponge doughs, liquid sponge doughs, or any other types of flour doughs would be similar.

In accordance with the data as shown in Table B, for example, during the manufacture of a bread dough employing the present invention, once the ingredients have been placed into the mixer, they are mixed in a prescribed manner. Firstly, the ingredients are pre-blended for one minute at 30 RPM; next, they are mixed at an increased speed of 120 RPM for 6 minutes. During this second step, the time required for all of the ingredients to become cohesive such that they no longer adhere to the mixer wall is accelerated. Lastly, the speed of the mixer is reduced to 60 RPM and the final development time is extended to 6 minutes. By so doing, the heat is removed that was generated during the development to a cohesive state during the final development cycle to the extent that final dough temperature was 4 degrees less than by the method of prior art. The total time required to complete formation of a dough (Table A) for the present invention was measured at 13 minutes and that for standard prior art methods was approximately 15 minutes. In this respect, it is to be noted that the prior art time as shown in the block diagram, calls for a longer mix time as compared to that of the present invention.

Obviously, with the method of the present invention a significant improvement in dough mixing will be manifest.

It will be understood that various changes and modifications may be made in the above described method which provides the characteristics of the invention without departing from the spirit of the invention.

TABLE A

| INGREDIENTS | BREAD DOUGH | BUN DOUGH | SWEET DOUGH |
|---|---|---|---|
| Flour | 100# | 100# | 100# |
| Water | 64# | 62# | 58# |
| Yeast | 2½# | 3½# | 5½# |
| Yeast Food | ½# | ½# | ½# |
| Sugar | 6# | 10# | 16# |
| Shortening | 3# | 5# | 14# |
| Salt | 2# | 2# | 3# |
| Minor Ingredients | 2# | 2# | 3# |
| Total | 180# | 185# | 198½# |

TABLE B
TYPICAL STRAIGHT DOUGH PROGRAM PER INVENTIVE METHOD

| Dough Type | Mixer Speed | Time Duration |
|---|---|---|
| Bread | 30 RPM | 1 min. |
|  | 120 RPM | 6 min. |
|  | 60 RPM | 6 min. |
|  |  | 13 min. |
| Bun | 30 RPM | 1 min. |
|  | 120 RPM | 7 min. |
|  | 60 RPM | 5 min. |
|  |  | 13 min. |
| Sweet | 20 RPM | 1 min. |
|  | 110 RPM | 5 min. |
|  | 40 RPM | 5 min. |
|  |  | 11 min. |

What is claimed:

1. A method of preparing dough, comprising the discrete sequential steps of:
   introducing raw dough ingredients into a mechanical mixer;
   initiating the mixing cycle by mixing the ingredients for a first time interval at a mixing speed sufficient for preliminary blending of the ingredients;
   increasing the mixing speed for a second time interval sufficient to develop the blended ingredients into a cohesive mass; and
   terminating the mixing cycle by reducing the mixing speed for a third time interval for final development of the dough, the reduced mixing speed being greater than the mixing speed during the first time interval.

2. The method of preparing dough in accordance with claim 1, and
   the increased mixing speed causing the temperature of the blended ingredients to rise as the cohesive mass is developed during the second time interval, and
   the mixing speed permitting the temperature of the cohesive mass to drop as the dough is finally developed during the third time interval to substantially the temperature of the blended ingredients.

3. The method of preparing dough in accordance with claim 2, and
   the second time interval being longer than the first time interval; and
   the third time interval is at least as long at the second time interval.

4. The method of preparing dough in accordance with claim 2, and
   the mixing speed during the second time interval is at least twice the mixing speed during the third time interval.

5. The method of preparing dough in accordance with claim 4, and
   the second time interval being longer than the first time interval; and
   the third time interval is at least as long at the second time interval.

* * * * *